United States Patent
Back et al.

[11] Patent Number: 6,022,148
[45] Date of Patent: Feb. 8, 2000

[54] POCKET CAGE FOR ROLLER BEARINGS

[75] Inventors: Lothar Back, Reichenbach; Uwe Brockmüller, Oberwerrn; Winfried Oestreicher, Schwebheim, all of Germany

[73] Assignee: SKF GmbH, Schweinfurt, Germany

[21] Appl. No.: 08/612,305

[22] Filed: Mar. 7, 1996

[30] Foreign Application Priority Data

Mar. 9, 1995 [DE] Germany ............... 295 04 069 U

[51] Int. Cl.[7] .................................................. F16C 33/46
[52] U.S. Cl. ................................................ 384/576; 384/572
[58] Field of Search .................................. 384/571, 572, 384/576, 580

[56] References Cited

U.S. PATENT DOCUMENTS

| | | | |
|---|---|---|---|
| 3,477,773 | 11/1969 | Altson | 384/576 |
| 4,136,916 | 1/1979 | Musselman et al. | 384/576 X |
| 4,317,601 | 3/1982 | Faigley, Jr. | 384/576 |

FOREIGN PATENT DOCUMENTS

| | | |
|---|---|---|
| 451825 | 11/1927 | Germany. |
| 3141813 C2 | 10/1981 | Germany. |
| 50224 | 3/1984 | Japan ............... 384/576 |

*Primary Examiner*—Thomas R. Hannon
*Attorney, Agent, or Firm*—Cowan, Liebowitz & Latman, P.C.

[57] ABSTRACT

A pocket cage of synthetic material for roller bearings including a plurality of rollers spaced circumferentially, consisting of side rings and ribs arranged between them, whose pocket-side working faces are adapted to the roller shape, each rib having a first section arranged in the region of the arc separating the rollers in the circumferential direction of the bearing, and a second section holding the rollers in the radial direction of the bearing, characterized in that the pockets are widened at least in the region of a side ring by reduction of the holding sections.

11 Claims, 1 Drawing Sheet

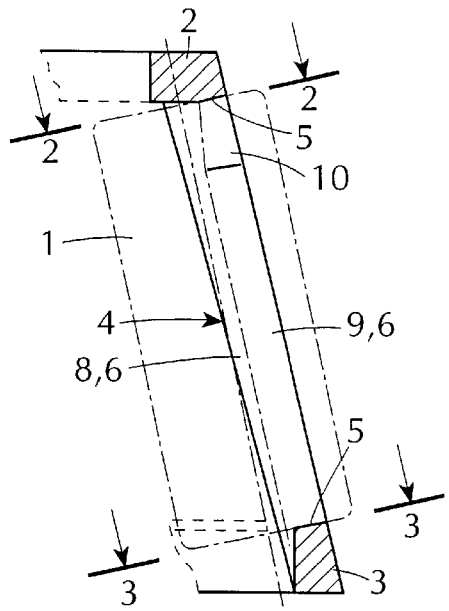
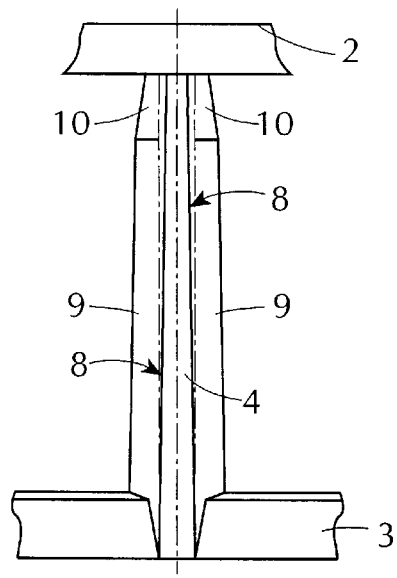
FIG. 1  FIG. 4
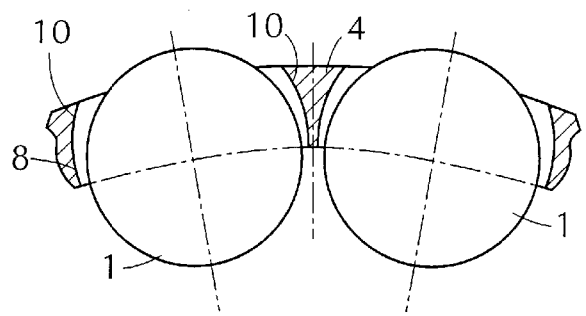
FIG. 2
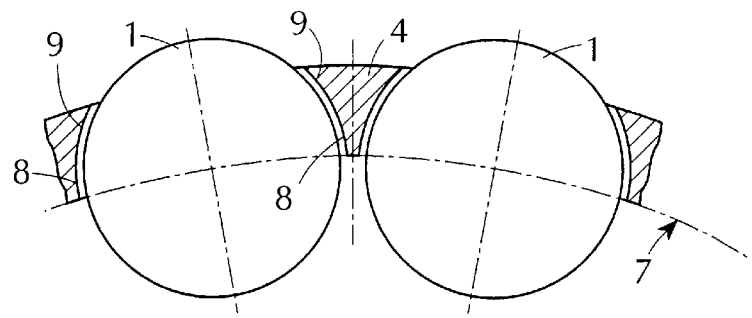
FIG. 3

POCKET CAGE FOR ROLLER BEARINGS

BACKGROUND OF THE INVENTION

The invention concerns a pocket cage of synthetic material for roller bearings including a plurality of rollers spaced circumferentially, consisting of side rings and ribs arranged between them, with pocket-side working faces adapted to the roller shape, each rib having a first section situated in the region of the arc separating the rollers in the circumferential direction of the bearing and a second section holding the rollers in the radial direction of the bearing.

A cage of synthetic material for tapered roller bearings, whose pocket-side working faces hold the rollers apart and simultaneously hold them radially when no outer ring is provided, is already disclosed in DE 3,141,813. In this case the inner ring is usually provided with two rims, resulting in more difficult assembly. In the known embodiment the elasticity of synthetic material is utilized to slip the rollers over the rim of the inner ring until they assume their operational position in the pockets behind the rim. Since the rim usually is only roughly finished, damage to the surface of the rollers is unavoidable.

In order to avoid this disadvantage, DE 451,825 proposes to design the pocket wider in a partial region, in order to make it possible for the roller to be deflected radially upon assembly. However, this involves a thin-walled sheet-metal cage without a holding sections for the rollers, wherein these move within the said enlarged pocket section even in operation. This results in guidance on only a partial section of the roller length, owing to which the desired function of the cage is only partially fulfilled. It is therefore to be expected, rather, that the rollers will tilt and fail to maintain orderly travel geometry.

SUMMARY OF THE INVENTION

The object of the invention is to provide a pocket cage of the type mentioned above wherein the rollers can be inserted free from damage and wherein the function of the holding sections is retained.

This object is accomplished by providing that the pockets are widened at least in the region of a side ring by reduction of the holding sections. In the accomplishment according to the invention, the section of the ribs separating the rollers may advantageously be retained unaltered. This results in guidance on the total length of the roller in operation. The function of the holding sections is not present only in the partial region concerned in front of the side ring, but is adequately performed by the remaining, far longer pocket section. The invention results in a pocket cage of synthetic material with outstanding guidance properties, which is inexpensive to manufacture and has the advantage of allowing insertion of the rollers over the rim of the inner ring free from damage.

These and additional features are described below by means of the example represented in the drawing.

BRIEF DESCRIPTION OF THE DRAWINGS

FIG. 1 shows the longitudinal section of the pocket of a cage for tapered roller bearings with widened pocket region, FIG. 2 is a cross section taken along line A—A of FIG. 1, FIG. 3 is a cross section taken along line B—B of FIG. 1 and FIG. 4 is a top radial view of a rib from inside, referred to the cage of FIG. 1.

DETAILED DESCRIPTION OF THE PREFERRED EMBODIMENT

The cage, represented in FIG. 1 only in the region of a pocket, is made of synthetic material in the injection-molding process. A tapered roller 1, which here in operational position cooperates with an inner ring, not represented, is inserted into the pocket. The cage consists of a small side ring 2 and a large side ring 3 with ribs 4 arranged between them and is thus formed in one piece. In addition to the front working faces 5 on the side rings 2, 3, the pocket-side rib faces are designed as working faces 6 for the roller surface and are closely adapted to the roller profile. This follows from FIG. 3. At the same time a separating section 8, arranged in the region of the arc 7 through the rollers, and a holding or restraining section 9 securing the rollers 1 against radial displacement are provided. The two sections 8, 9 together produce the working face 6 for the roller 1. The said described combination of the sections 8, 9 extends over about two-thirds of the roller length starting from the large side ring 3. The adjoining one-third of the working face 6 differs from the working profile described and follows from FIG. 2. Here the separating section 8 continues unaltered as far as the small side ring 2. In contrast, the holding section 10, seen from the cage, is reduced radially as well as in its circumferential direction. At the same time, however, a smooth transition between the two sections 8, 10 remains. The small roller side concerned can thus be displaced further radially outward, until here too a limit is created by the reduced holding sections 10. Accordingly, the pocket is designed slightly wider at this point.

The different holding sections 9, 10 along the rib 4 again follow clearly from the top view of a rib 4 from the inside of the cage of FIG. 4. Here the differences are represented exaggerated. This results in unaltered separating sections 8, running linearly, over the entire length of the rib 4. From the large side ring 3 there extend over about two-thirds the length concavely shaped holding sections 9, which continue steadily reduced 10 to the small ring 2, terminating in it almost completely reduced.

The features and advantages of the invention, described here in a cage for tapered ball bearings, are equally valid in a similar cage for cylindrical roller bearings.

The foregoing description of the preferred embodiment is presented for illustrative purposes only and is not intended to limit the scope of the invention as defined in the appended claims. Modification may be readily effected by one having ordinary skill in the art without departing from the spirit and scope of the invention concept herein disclosed.

We claim:

1. A pocket cage of synthetic material for a roller bearing which includes a plurality of rollers spaced circumferentially, the pocket cage including first and second side rings and ribs of predetermined length arranged between them, each two adjacent ribs having working faces defining an arcuate pocket region for a roller adapted to the roller shape, each rib having a first section arranged in sold arcuate region separating the rollers in the circumferential direction of the bearing and a second section holding the rollers in the radial direction of the bearing, characterized in that the pockets are widened at least in the region of the first side ring by reduction of the holding sections.

2. A pocket cage according to claim 1, characterized in that said reduced holding section of each of said ribs is steadily reduced in width at the last one-fourth of said rib length from said first of said side rings in the direction of the other of said side rings.

3. A pocket cage according to claim 1 or 2, characterized in that said reduced holding sections are reduced in the radial direction of the cage.

4. A pocket cage according to claim 1 or 2, characterized in that said reduced holding sections are reduced in the circumferential direction of the cage.

5. A pocket cage according to claim 4, characterized in that the reduced holding sections are reduced in the radial direction of the cage.

6. A pocket cage of synthetic material for a roller bearing having a plurality of rollers spaced circumferentially, the cage having side rings and ribs extending lengthwise parallel to the axis of the cage and between and joined to said side rings, each two adjacent ribs having facing working surfaces defining a pocket having shape for receiving a roller, each pocket having width in the circumferential direction between said adjacent ribs, each rib having a first portion for separating adjacent rollers circumferentially and a second portion for restraining said rollers from a radial outward direction, the improvement wherein each of said pockets has width that is wider near one of said side rings than near the other of said side rings.

7. A pocket cage according to claim 6 wherein each of said ribs is thinner in the circumferential direction near one of said side rings to form said greater width of each pocket.

8. A pocket cage according to claim 7 wherein each of said ribs is reduced in width along about one fourth of its length.

9. A pocket cage according to claim 7 wherein each of said ribs has said second portion radially outward of said first portion and only said second portion of each rib is the thinner part.

10. A pocket cage according to claim 6 or 7 wherein each of said ribs is thinner in the radial direction near one of said side rings to form said greater width of each pocket.

11. A pocket cage according to claim 10 wherein each of said ribs has said second portion radially outward of said first portion and only said second portion of each rib is the thinner part.

\* \* \* \* \*